United States Patent [19]

Schulz

[11] 4,163,081

[45] Jul. 31, 1979

[54] SELF-ADHERING SILICONE COMPOSITIONS AND PREPARATIONS THEREOF

[75] Inventor: Jay R. Schulz, Bangor Township, Bay County, Mich.

[73] Assignee: Dow Corning Corporation, Midland, Mich.

[21] Appl. No.: 904,175

[22] Filed: May 8, 1978

[51] Int. Cl.² ............................................. C08L 83/04
[52] U.S. Cl. ............................ 428/429; 260/37 SB; 428/447; 428/450; 528/15; 528/22
[58] Field of Search ............... 260/37 SB; 528/15, 22

[56] References Cited

U.S. PATENT DOCUMENTS

| | | | |
|---|---|---|---|
| 3,699,072 | 10/1972 | Clark et al. | 260/37 SB |
| 3,817,909 | 6/1974 | Toporcer et al. | 260/37 SB |
| 3,873,334 | 3/1975 | Lee et al. | 106/287 SE |
| 3,892,707 | 7/1975 | Itoh et al. | 260/37 SB |
| 3,960,800 | 6/1976 | Kohl | 260/32.8 SB |
| 3,996,184 | 12/1976 | Klosowski | 260/37 SB |

Primary Examiner—Lewis T. Jacobs

Attorney, Agent, or Firm—Roger H. Borrousch

[57] ABSTRACT

Mixing vinyl-containing polydiorganosiloxane, an organosilicon compound containing silicon-bonded hydrogen atoms, a platinum catalyst, and an amidosiloxane provides a composition which exhibits improved adhesion to many substrates without the use of a primer when heat cured in contact with the substrate. An example of the amidosiloxane is

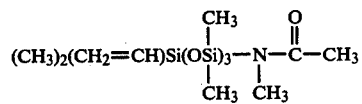

The compositions have self-adhering properties and also exhibit an extended pot life. The compositions can be prepared by mixing the polydiorganosiloxane, platinum catalyst, and amidosiloxane into one package of a two package product and the organosilicon compound forms the other package. The two packages are mixed before use to form a curable product.

27 Claims, No Drawings

SELF-ADHERING SILICONE COMPOSITIONS AND PREPARATIONS THEREOF

BACKGROUND OF THE INVENTION

1. Field of the Invention

This invention relates to silicone elastomer compositions which cure on substrates to self-adhering elastomers and to methods for their preparation.

2. Description of the Prior Art

Adhering to silicone elastomer to substrates is a problem. Attempts to solve the adhesion problem of silicone elastomers has taken many forms. Some solutions have been successful within limits. Additional solutions are still needed. Priming a substrate prior to applying an uncured silicone elastomer composition is one solution. The priming methods are adequate for the purpose of achieving a strong bond, but they suffer from the inconvenience of being at least two step processes. Another solution is the use of one or more additives in compositions to impart the adhesion property between a cured elastomer and a substrate. Additives are usually specific for each composition, application, and condition under which they are used. Most additives have shortcomings, such as interfere with cure or vulcanization of the composition, cause one or more of the cured properties of the product to decrease, are limited to the substrates to which the cured composition will bond, reduce the shelf stability of the composition, and increase the cost of the composition significantly.

U.S. Pat. No. 3,873,334 and U.S. Pat. No. 3,960,800 describe primers for use with silicone elastomer compositions which cure through the reaction of alkenyl groups and silicon-bonded hydrogen atoms. These patents describe applying primers to substrates to achieve adhesion and do not suggest the use of additives to silicone elastomer compositions for the purpose of enhancing the adhesion.

U.S. Pat. No. 3,699,072 describes a composition of a vinyldiorganosiloxy endblocked polydimethylsiloxane and a mixture of an organosiloxane having 5 to 20 silicon atoms per molecule and an average of at least three silicon-bonded hydrogen atoms per molecule and a modified organosiloxane having 6 to 21 silicon atoms per molecule, an average of at least two silicone bonded hydrogen atoms per molecule and an average of at least one unit of

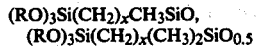

and mixtures thereof where R is methyl, ethyl or acetyl and x is 2 or 3 is curable to an elastomer which has improved unprimed adhesion to substrates, particularly metal substrates.

This reference teaches a composition which cures through the reaction of vinyl groups on silicon with hydrogen atoms on silicon. The modified organosiloxane is part of the crosslinker system which has been modified to include the radicals specified above. The reference does not teach an additive such as that taught by the instant invention.

U.S. Pat. No. 3,892,707 describes silicone elastomer compositions comprising a diorganovinylsilyl-terminated diorganopolysiloxane, or organohydrogen polysiloxane, platinum or platinum compound is the catalyst, and an unsaturated double bond containing isopropenoxysilane, which is represented by the general formula

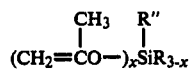

where R is an unsubstituted or substituted monovalent hydrocarbon group, R" is a monovalent organic group having an unsaturated double bond and x is 1, 2, or 3, or a product of its partial hydrolysis-condensation. The compositions are cured on heating with the formation of strong adhesive bonding to the surface of a substrate to which they are in contact.

The isopropenoxysilane of this reference does not teach the usefulness of the amidosiloxane used as an additive to improve adhesion to a substrate as disclosed by the instant invention.

SUMMARY OF THE INVENTION

Compositions obtained by mixing vinyl-containing polydiorganosiloxane, organosilicon compound having silicon-bonded hydrogen atoms, a platinum catalyst, and certain amidosiloxanes show improved adhesion to substrates when a composition is cured in contact with a substrate.

DESCRIPTION OF THE INVENTION

This invention relates to a composition comprising a product obtained by mixing (A) a vinyl-containing polydiorganosiloxane having an average of about two silicon-bonded vinyl radicals per molecule, an average ratio of organo radicals per silicon atom within a range of greater than 2 up to and including 2.03 and each organo radical of the polydiorganosiloxane being a monovalent radical selected from the group consisting of hydrocarbon radicals and fluorinated alkyl radicals both having less than 7 carbon atoms per radical, (B) an organosilicon compound having an average of at least 3 silicon-bonded hydrogen atoms per organosilicon compound molecule and valences of any silicon atom in the organosilicon compound not satisfied by a hydrogen bond are satisfied by a divalent oxygen atom or an organo radical wherein each organo radical is a monovalent radical selected from the group consisting of hydrocarbon radicals and fluorinated alkyl radicals both having less than 7 carbon atoms per radical, the organosilicon compound having no more than one silicon-bonded hydrogen atom on any one silicone atom, (C) a platinum catalyst, and (D) an amidosiloxane of the formula

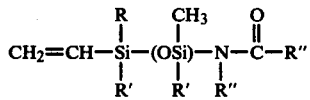

where R is a methyl, ethyl, or phenyl radical; R' is a methyl, ethyl, or 2-(perfluoroalkyl)ethyl radical in which the perfluoroalkyl radical contains 1 to 4 inclusive carbon atoms; R" is a methyl or ethyl radical; and x is an integer of from 3 to 20, (A) and (B) being present in amounts sufficient to provide a mole ratio of silicon-bonded hydrogen atoms in (B) to silicon-bonded vinyl radical in (A) in the range of 0.5 to 10, (D) being present in amounts of 0.01 to 2.5 parts by weight per 100 parts by weight of the composition.

The amidosiloxane (D) is a short chain linear amidosiloxane of the formula

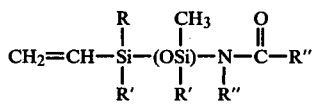

where R, R', R", and x are defined above. The amidosiloxanes used in the compositions and methods of this invention are disclosed in application Ser. No. 904,177 filed on even date herewith, entitled "Short Chain Linear Amidosiloxanes," by Gary R. Homan and Louis H. Toporcer which is hereby included by reference to show the amidosiloxanes and a method of manufacturing the amidosiloxanes. These amidosiloxanes can be prepared by reacting a short chain monochlorosiloxane with an amide in the presence of an anhydrous inert solvent and a molar excess of the amide over the amount required by the stoichometry can be used to assure that the reaction will go to completion. An excess of triethylamine can also be used to assure that all the halogen liberated by the reaction is combined into an insoluble salt. The reaction can be carried out by slowly adding the triethylamine to a mixture of the monochlorosilane and the amide. Means of excluding moisture from the reaction mixture during processing and storage of the amidosiloxane must be under essentially anhydrous conditions because the amido radical bonded to a silicon atom is reactive with moisture.

The amidosiloxane in an amount of 0.01 to 2.5 parts by weight is combined with 100 parts by weight of a silicone composition comprising (A), (B), and (C) to provide the compositions of this invention. When (A), (B), and (C) are mixed a reaction begins, even at room temperature and cure will take place within a relatively short time, such as a few minutes to a few hours depending upon the type and amount of ingredients, unless some means is used to inhibit the curing reaction. In the present invention, compositions comprising (A), (B), and (C) when mixed with the amidosiloxane have extended pot life at room temperature of several days, often in excess of a week. Because the compositions have this extended room temperature pot life, the compositions are best cured by heating above 70° C. to provide an elastomer within an economical time especially for commercial applications. The compositions of this invention cure in shorter time periods the higher the temperature, such as from several hours at 100° C. to less than one hour at 150° C. or above.

As stated above, the compositions of this invention can be prepared by combining (A), (B), (C) and the amidosiloxane, but the resulting product is not suitable for storing for extended periods of time, unless additional inhibitor for the curing reaction is present. Many inhibitors are known, such as the acetylenic inhibitors described in U.S. Pat. No. 3,445,420 which is hereby incorporated by reference to show the acetylenic inhibitors.

It is not necessary to use inhibitors for the compositions of this invention unless one wishes to store the complete composition in one package. Another approach is to store the components of the composition in two or more packages, preferably two, and mix the contents of the two packages when one wishes to use the product. This approach is preferred because one avoids an additional ingredient, the inhibitor, and still has a sufficiently long working time which would be suitable for commercial production lines. In using two packages, one can mix (A), (C) and the amidosiloxane making a Composition No. 1 for one package and use :B; for a Composition No. 2 in a second package. A preferred method is to combine some of (A), all of (C) and the amidosiloxane to form a Composition No. 1 for one package and combine the remainder of (A) and all of (B) to form a Composition No. 2 for a second package. Then the compositions of this invention can be made by mixing Composition No. 1 and Composition No. 2 of either of the above combinations when one is ready to use it. One convenient method for making the composition in two packages is to make Composition No. 1 and Composition No. 2 so that they can be combined in equal weight ratios.

Mixing of the ingredients can be carried out by the use of conventional mixing equipment, preferably the equipment is designed for moisture sensitive materials. For the lower viscosity materials, mixing can be done by using low shear mixing apparatus, but for high viscosity materials, such as gums, high shear mixing equipment, such as rubber mills may be required. Organic solvents can be used to aid in the mixing process. When solvents are used, they should be solvents which do not interfere with the ingredients.

The vinyl-containing polydiorganosiloxane, (A), has an average of about two silicon-bonded vinyl radicals per molecule. The number of vinyl radicals can vary from two per molecule, such as (A) is a blend of two or more polydiorganosiloxanes in which some molecules may have more vinyl radicals than two per molecule and some may have less than two vinyl radicals per molecule where the average would be about two vinyl radicals per molecule. Although it is not required that the silicon-bonded vinyl radicals be located in the alpha, omega positions of the polydiorganosiloxane, it is preferred that at least some vinyl radicals be located in these positions, and preferably the vinyl radicals are located at the polymer ends because such polydiorganosiloxanes are more economical to prepare and provide satisfactory products. However, because of the polymeric nature of (A), its preparation results in products which have some variations in structure and thus some vinyls may not be in the alpha, omega positions even if the intent is to have them in these positions. Thus, if small amounts of monoorganosiloxane units are present, the resulting polydiorganosiloxane may have some vinyl radicals located at branch sites.

The polydiorganosiloxanes of (A) are essentially linear polymers which can have some branching, however, the polymers have an average ratio of organo radicals per silicon atom of from greater than 2 up to and including 2.03. The polydiorganosiloxanes, therefore, have silicon-oxygen-silicon backbones with an average of greater than two organo groups per silicon atom. Preferably, (A) is made up of diorganosiloxane units with triorganosiloxane units for end groups, but small amounts of monoorganosiloxane units and $SiO_2$ units may also be present. The organo radicals having less than 7 carbon atoms per radical are each selected from monovalent hydrocarbon radicals such as methyl, ethyl, vinyl, propyl, hexyl and phenyl and monovalent fluorinated alkyl radicals, such as the perfluoroalkylethyl radicals including such species as 3,3,3-trifluoropropyl, B-(perfluoroethyl)ethyl and B-(perfluoropropyl)ethyl. Examples of (A) are dimethylvinylsiloxy endblocked polydimethylsiloxane, methylphenylvinylsiloxy endblocked polydimethylsiloxane, dimethylvinylsiloxy endblocked polymethyl-(3,3,3-trifluoropropyl)siloxane, dimethylvinylsiloxy enblocked polydiorganosiloxane copolymer of dimethylsiloxane units and methylphenylsiloxane units, and methylphenylvinylsiloxy endblocked polydiorganosiloxane copolymer of dimethylsiloxane units and diphenylsiloxane units. The polydiorganosiloxane can have siloxane units such as dimethylsiloxane units, methylphenylsiloxane units, diphenylsiloxane units, methyl-(3,3,3-trifluoropropyl)siloxane units, methylethylsiloxane units, methylvinylsiloxane units, monomethylsiloxane units, monophenylsiloxane units, dimethylvinylsiloxane units, trimethylsiloxane units, methylphenylvinylsiloxane units and $SiO_2$ units. Polydiorganosiloxanes of (A) can be single polymers or mixtures of polymers. These polymers should have at least 50 percent of the organic radicals as methyl radicals. The polydiorganosiloxanes of (A) are well known in the art. A preferred (A) is a polydimethylsiloxane endblocked with dimethylvinylsiloxy units or methylphenylvinylsiloxy units where the ratio of the organo radicals per silicon atom is from 2.0015 to 2.03.

Organosilicon compound, (B), is a silicon compound containing at least 3 silicon-bonded hydrogen atoms per molecule. The silicon-bonded hydrogen atoms should each be on different silicon atoms. However, certain preparations may result in some small amount of silicon atoms with two silicon-bonded hydrogen atoms per silicon atom. These materials are not excluded from use in the present invention inasmuch as their removal from the other species could be prohibitively expensive and no detrimental effects are known from the use of such mixtures. For practical purposes, the organosilicon compounds are those which are designed to have one silicon-bonded hydrogen atom per silicon atom.

The organosilicon compound, (B), can be any siloxane having an average of at least three silicon-bonded hydrogen atoms per molecule and an average of no more than one silicon-bonded hydrogen atom per silicon atom. The remaining valences of the silicon atom are satisfied by divalent oxygen atoms or by monovalent radicals of alkyl having one to six carbon atoms per radical, such as methyl, ethyl, propyl, isopropyl, butyl, tertiary butyl, pentyl, hexyl, cyclohexyl, or phenyl or 3,3,3-trifluoropropyl. The organohydrogensiloxanes can be homopolymers, copolymers and mixtures thereof which contain siloxane units of the following types:

$RSiO_{1.5}$, $R_2SiO$, $R_3SiO_{0.5}$ $RHSiO$, $HSiO_{1.5}$, $R_2HSiO_{0.5}$ $H_2SiO$, $RH_2SiO_{0.5}$ and $SiO_2$ where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethylsiloxane and methylhydrogensiloxane. Preferably, the organohydrogensiloxanes have an average of at least five silicon-bonded hydrogen atoms per molecule. It is also preferred that (B) have less than 50 silicon atoms per molecule. Some additional species of organosilicon compounds, (B) can be found in U.S. Pat. No. 3,697,473 which is hereby incorporated to show species within the scope of (B) but is not intended to limit the scope of (B). U.S. Pat. No. 3,697,473 is also included by reference to show that in addition to species of (B) having at least 3 silicon-bonded hydrogen atoms, species which have 2 silicon-bonded hydrogen atoms can be combined with (B) for the attainment of specific properties.

Ingredients (A) and (B) are present in the compositions of this invention in amounts sufficient to provide a mol ratio of silicon-bonded hydrogen atoms to silicon-bonded vinyl radicals of 0.5 to 10. For the preparation of elastomeric compositions, the mol ratio of silicon-bonded hydrogen atoms in (B) to the silicon-bonded vinyl radicals in (A) is from 1 to 10 and for the preparation of gel-forming compositions the mol ratio of silicon-bonded hydrogen atoms in (B) to the silicon-bonded vinyl radicals in (A) is from 0.5 to 0.9.

The platinum catalyst, (C) can be any of the platinum catalysts known to catalyze the addition of silicon-bonded hydrogen atoms to silicon-bonded vinyl radicals. Platinum catalysts can be any of the known forms ranging from platinum as such, or as deposited on carriers such as silica gel or powdered charcoals to platinic chloride, salts of platinum, chloroplatinic acid and various complexes. Many of these platinum catalysts are described in U.S. Pat. No. 3,697,473 which is hereby incorporated to show platinum catalysts. One preferred class of platinum catalysts is described in U.S. Pat. No. 3,419,593 which is hereby incorporated by reference to show the preparation of this class of platinum catalysts and to show additional catalyst descriptions. Of the class of platinum catalysts described in U.S. Pat. No. 3,419,593 the most preferred is a reaction product of chloroplatinic acid and a polyorganosiloxane having at least two dimethylvinylsiloxy units per molecule and any additional siloxane units being dimethylsiloxane. The platinum catalyst, (C) can be used in any catalytic quantity, such as in an amount sufficient to provide at least 0.1 part by weight platinum per one million parts by weight of (A), preferably at least one part by weight platinum per one million parts by weight (A) is used.

The compositions of this invention can also contain fillers, both extending fillers and reinforcing fillers. Extending fillers include such materials as quartz, calcium carbonate, potassium titanate, aluminum silicate, alumina, zinc oxide, titanium dioxide and ferric oxide. Reinforcing fillers include such materials as carbon blacks and silicas such as fume silica, silica aerogels, precipitated silicas and the like. The fillers, particularly the reinforcing silicas can be treated with organosilicon materials such as chlorosilanes, silazanes, alkoxysilanes and cyclic siloxanes to produce hydrophobic surfaces.

The compositions can also contain pigments, colorants, flame retardant additives, and plasticizers.

The composition of this invention can also contain a benzene soluble resin copolymer, (G), consisting essentially of triorganosiloxy units and $SiO_2$ units in which the mole ratio of triorganosiloxy units to $SiO_2$ units is in the range of 0.6 to 1. The triorganosiloxy units are present as a combination of trimethylsiloxy units and dimethylvinylsiloxy units such that the dimethylvinylsiloxy units contribute sufficient vinyl to the resin copolymer to provide a vinyl content of from 0.5 to 3.5 weight percent vinyl. This type of vinyl-containing resin copolymer is described in U.S. Pat. No. 3,284,406 which is hereby incorporated by reference to show vinyl-containing benzene soluble resin copolymers. Additionally, these benzene soluble copolymers can be prepared by the method described in U.S. Pat. No. 2,676,182 which is hereby incorporated by reference to show a method of preparation.

A preferred embodiment is a composition which cures to an elastomer. These compositions can exhibit a flame retardant property and can be used as embedding materials, encapsulants for electrical components, as an electrical insulation, as coatings, and as potting materials. The compositions of this embodiment comprise a product obtained by mixing (A) a polydimethylsiloxane which is endblocked with dimethylvinylsiloxy units or methylphenylvinylsiloxy units and which has an average ratio of organo radicals per silicon atom in a range of 2.0025 to 2.02, (B) is a polymer having at least 3 silicon-bonded hydrogen atoms per molecule consisting of trimethylsiloxy units, dimethylsiloxane units and methylhydrogensiloxane units where the average number of siloxane units per molecule is less than 50, (C) is a reaction product of chloroplatinic acid and a polyorganosiloxane having at least two dimethylvinylsiloxy units per molecule and any additional siloxane units being dimethylsiloxane, (D) is an amidosiloxane or a mixture of amidosiloxanes in which R and R' are methyl radicals and x has an average value of from greater than 3 to 6, and an extending filler (E) is present. In this composition (A) is present in an amount of 100 parts by weight, (B) is present in an amount of 4 to 10 parts by weight, (C) is present in an amount sufficient to provide from 5 to 50 parts by weight platinum per one million parts by weight of (A), (E) is present in an amount of 20 to 150 parts by weight, and the ratio of silicon-bonded vinyl radicals in (A) is in the range of from 1.2 to 4. The most preferred compositions of this embodiment are those in which the extending filler (E) is a finely divided quartz, and pigment is present, particularly carbon black which improves the flame retardant properties of the cured products. These compositions can contain polymethylvinylcyclosiloxanes in amounts of 0.01 to 0.5 part by weight. These compositions when applied to substrates such as glass, aluminum, and stainless steel, and heated, cure to elastomers which show improved adhesion of the elastomer to the substrate.

Another preferred embodiment is a composition similar to the above preferred embodiment but in which there is also present the benzene soluble resin copolymer (G) present in an amount of from 25 to 50 parts by weight. The most preferred compositions of this embodiment are those in which (E) is a finely divided quartz and pigment is present, particularly carbon black which improves the flame retardant properties of the cured products. These compositions can contain polymethylvinylcyclosiloxanes in amount of from 0.01 to 0.5 parts by weight.

These compositions, when applied to substrates such as glass, aluminum, and stainless steel and heated, cure to elastomers which show improved adhesion of the elastomer to the substrate. The compositions are particularly useful as sealants to bond these substrates together as in aluminum framed windows.

Still another preferred embodiment is a composition which heat cures to an elastomer useful as embedding materials, encapsulants, coatings and potting materials, but tougher than those described above. These compositions are similar to the above preferred embodiments except in place of the extending filler, there is used a reinforcing silica filler which has its surface treated with trimethylsiloxy units. The silica filler, (E) is present in an amount of from 5 to 50 parts by weight based on 100 parts by weight of (A) and the resin copolymer (G) is present in an amount of from 5 to 30 parts by weight, (B) is present in an amount of 0.5 to 10 parts by weight, and the ratio of silicon-bonded hydrogen atoms in (B) to the silicon-bonded vinyl radicals in (A) is from 2 to 8. These compositions of this embodiment can contain a pigment, particularly carbon black or titanium dioxide to improve the flame retardant properties of the cured product. The compositions can also contain polydimethylvinylcyclosiloxanes in an amount of from 0.01 to 0.5 parts by weight. Compositions in which (A) is present as a blend of a high viscosity polymer and a low viscosity polymer are preferred. Such blends are those in which one polydimethylsiloxane has an average ratio of organo radicals per silicon atom of 2.004 to 2.02 and a second polydimethylsiloxane has an average ratio of organo radicals per silicon atom of 2.0025 to 2.005.

The following examples are presented for illustrative purposes only and should not be construed as limiting the present invention which is properly delineated in the claims. In the examples the methyl and vinyl radical are represented by Me and Vi respectively. All parts are parts by weight.

EXAMPLE 1

Compositions were prepared in two parts. Composition No. 1 was prepared by mixing 100 parts of methylphenylvinylsiloxy endblocked polydimethylsiloxane (Polymer A) having a viscosity at 25° C. in the range of 0.3 to 0.5 Pa.s (Pascal. Seconds) and an average ratio of organic radicals per silicon atom in the range of 2.012 to 2.016, 88.94 parts of 5 micrometer quartz filler, 0.54 part of a chloroplatinic acid complex of symmetricaldivinyltetramethyldisiloxane diluted with Polymer A to provide about 0.7 weight percent platinum, 1.85 parts of zinc oxide, and 0.9 part of carbon black.

To 150 gm portions of Composition No. 1 there was added amidosiloxane of the formula

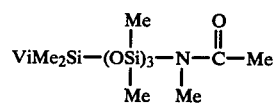

In a composition identified in Table I as Composition No. 1-A, there was added 1.5 g of the amidosiloxane. In a composition identified in Table I as Composition NO. 1-B, there was added 3.0 g of the amidosiloxane. In a composition identified in Table I as Composition No. 1-C, there was added 6.0 g of the amidosiloxane.

Composition No. 2 was prepared by mixing 100 parts of Polymer A, 98.9 parts of 5 micrometer quartz, 13.4 parts of a trimethylsiloxy endblocked polyorganosiloxane (Polymer B) having 37.5 mole percent dimethylsiloxane units and 62.5 mole percent methylhydrogensiloxane units where the mole percent is exclusive of the trimethylsiloxy units and having a silicon-bonded hydrogen atom content in the range of about 0.7 to 0.8 weight percent, and 0.25 part of polymethylvinylcyclosiloxane having from 3 to 7 methylvinylsiloxane units per molecule.

Elastomeric compositions were prepared by mixing each of Composition No. 1, Composition No. 1-A, Composition No. 1-B, and Composition No. 1-C with Composition No. 2 in equal weight amount. The resulting compositions were coated on aluminum test panels and cured by heating for 1 hour at 150° C. These aluminum-elastomer assemblies were used to measure adhesion under shear. The test was done in accordance with ASTM-D1002 test procedure with the results reported in megapascal (MPa). The percentage of cohesive failure was determined by observing the adhesion test panels after failure in the lap shear test and determining the amount of area of failure at the interface between the aluminum panel and the elastomer, adhesive failure, and the amount of area of the aluminum panel where the elastomer rupture instead of separation at the interface, cohesive failure. Other test samples were prepared and tested in accordance with ASTM-D2240 procedure for durometer with the results on the Shore A scale and ASTM-D412 procedure for tensile strength and elongation at break with the results in MPa and percent respectively. The test values shown in Table I are averages of three test samples.

TABLE I

| Composition Prepared from | Adhesion MPa | Percent Cohesive Failure | Durometer, Shore A | Tensile Strength MPa | Elongation, percent |
|---|---|---|---|---|---|
| 1** | 0.48 | 0 | 49 | 2.88 | 117 |
| 1-A | 1.94 | 91 | 48 | 2.43 | 117 |
| 1-B | 1.95 | 100 | 48 | 2.32 | 103 |
| 1-C | 1.45* | 100 | 49 | 2.07 | 83 |

*appeared to have weak layer at innerface of lap shear sample.
**comparative example

EXAMPLE 2

A composition was prepared in two parts. Composition No. 1 was prepared by mixing 69 parts of methylphenylvinylsiloxy endblocked polydimethylsiloxane (Polymer C) having a viscosity at 25° C. in the range of 1.8 to 2.4 Pa.s and an average ratio of organic radicals per silicon atom in the range of 2.006 to 2.007, 31 parts of methylphenylvinylsiloxy endblocked polydimethylsiloxane (Polymer D) having a viscosity in the range of 7 to 12 Pa.s and an average ratio of organic radicals per silicon atom in the range of 2.0036 to 2.0043, 37.5 parts of fume silica having its surface treated with trimethylsiloxy units, 5.12 parts of titanium dioxide, 12.43 parts of a benzene soluble resin copolymer of triorganosiloxy units and SiO$_2$ units in a mole ratio of about 0.7 mole of triorganosiloxy unit per mole of SiO$_2$ unit where the triorganosiloxy units were trimethylsiloxy units and dimethylvinylsiloxy units and the resin copolymer had from 1.4 to 2.2 weight percent silicon bonded vinyl radical, and 0.27 part of the platinum complex defined in Example 1.

Composition No. 2 was prepared by mixing 100 parts of Polymer C, 53.85 parts of the resin copolymer defined above, 82.92 parts of Polymer B and 3 parts of polymethylvinylcyclosiloxane.

To 100 parts of Composition No. 1 there was added 1.5 parts of the amidosiloxane of Example 1 to yield a composition identified as Composition No. 1-D. Composition No. 1-D was sealed in a glass jar and stored overnight.

An elastomeric composition was then prepared by mixing 10 gm of Composition No. 1-D and 1 gm of Composition No. 2. The resulting composition was coated on a glass test panel and cured by heating for approximately 20 minutes at 120° C. There was good adhesion between the cured elastomeric composition and the glass substrate.

A second composition was prepared by mixing 10 parts of Composition No. 1-D with 1 part of Composition No. 2. This composition was a repeat.

A third composition was prepared by mixing 10 parts of Composition No. 1 with 1 part of Composition No. 2. This composition was a control and is identified as Composition No. 1 in Table II and was outside the scope of this invention.

The resulting compositions were coated on aluminum test panels, cured for 1 hour at 150° C. and the physical properties were tested as described in Example 1. The results of the test were as shown in Table II.

TABLE II

| Property | Composition | | |
|---|---|---|---|
| | 1-D | 1-D(repeat) | 1* |
| Adhesion, MPa | 3.35 | 3.98 | 0.48 |
| Percent Cohesive Failure | 90 | 95 | 0 |
| Durometer, Shore A | 42 | 46 | 40 |
| Tensile Strength, MPa | 5.12 | 6.06 | 5.51 |
| Elongation, percent | 253 | 253 | 267 |

*comparative example

EXAMPLE 3

A composition was prepared in two parts. Composition No. 1 was prepared by mixing 100 parts of phenylmethylvinylsiloxy endblocked polydimethylsiloxane (Polymer E) having a viscosity at 25° C. in the range of 25 to 35 Pa.s and an average ratio of organic radicals per silicon atom in the range of 2.0026 to 2.0029, 34.23 parts of the resin copolymer of Example 2, 80.52 parts of 5 micromiter quartz, and 0.39 part of the platinum complex of Example 1. To 100 gm of Composition No. 1 was added 1.5 gm of the amidosiloxane of Example 1 to yield Composition No. 1-E.

Composition No. 2 was prepared by mixing 100 parts of Polymer E, 34.23 parts of the resin copolymer of Example 2, 62.5 parts of Polymer B, 10.52 parts of chromium oxide, and 1.87 parts of polymethylvinylcyclosiloxane having from 3 to 7 methylvinylsiloxane units per molecule.

An elastomeric composition was prepared by mixing 10 parts of Composition No. 1-E with 1 part of Composition No. 2.

This elastomeric composition was coated on tin plated steel, stainless steel, aluminum, and glass. After curing for 45 minutes at 100° C. and 45 minutes at 150° C. it showed excellent adhesion to all the substrates.

The same elastomeric composition was coated on aluminum and on stainless steel panels for adhesion under shear testing and cured 1 hour at 150° C.

The adhesion on aluminum was 3.97 MPa with 100 percent cohesive failure. The adhesion on stainless steel was 1.69 MPa with 0 percent cohesive failure. The cured elastomer had a durometer of 44 on the Shore A scale, a tensile strength at break of 4.64 MPa and an elongation at break of 253 percent.

That which is claimed is:

1. A composition comprising a product obtained by mixing
   (A) a vinyl-containing polydiorganosiloxane having an average of about two silicon-bonded vinyl radicals per molecule, an average ratio of organo radicals per silicon atom within a range of greater than 2 up to and including 2.03 and each organo radical of the polydiorganosiloxane being a monovalent radical selected from the group consisting of hydrocarbon radicals and fluorinated alkyl radicals both having less than 7 carbon atoms per radical, (B) an organosilicon compound having an average of at least 3 silicon-bonded hydrogen atoms per organosilicon compound molecule and valences of any silicon atom in the organosilicon compound not satisified by a hydrogen bond are satisfied by a divalent oxygen atom or an organo radical wherein each organo radical is a monovalent radical selected from the group consisting of hydrocarbon radicals and fluorinated alkyl radicals both having less than 7 carbon atoms per radical, the organosilicon compound having no more than one silicon-bonded hydrogen atom on any one silicone atom, (C) a platinum catalyst, and (D) an amidosiloxane of the formula

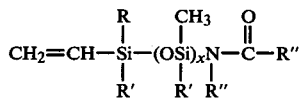

where R is a methyl, ethyl, or phenyl radical; R' is a methyl, ethyl, or 2-(perfluoroalkyl)ethyl radical in which the perfluoroalkyl radical contains 1 to 4 inclusive carbon atoms; R" is a methyl or ethyl radical; and x is an integer of from 3 to 20, (A) and (B) being present in amount sufficient to provide a mole ratio of silicon-bonded hydrogen atoms in (B) to silicon-bonded vinyl radical in (A) in the range of 0.5 to 10, (D) being present in amounts of 0.01 to 2.5 parts by weight per 100 parts by weight of the composition.

2. The composition according to claim 1 in which (A) is a polydimethylsiloxane endblocked with triorganosiloxy units selected from the group consisting of dimethylvinylsiloxy units and methylphenylvinylsiloxy units having an average ratio of organo radicals per silicon atom in the range of 2.0015 to 2.03, (B) is a polymer of units selected from the group consisting of trimethylsiloxy units, dimethylsiloxane unit, methylhydrogensiloxane unit, and dimethylhydrogensiloxy unit, (D) is a mixture of amidosiloxanes in which x is an integer of from 3 to 20 and has an average value of from greater than 3 to less than 20.

3. The composition according to claim 2 in which x has an average value of from greater than 3 to 6.

4. The composition according to claim 1 in which (A) is a polydimethylsiloxane endblocked with triorganosiloxy units selected from the group consisting of dimethylvinylsiloxy units and methylphenyivinylsiloxy units having an average ratio of organic radicals per silicon atom in the range of 2.0015 to 2.03, (B) is a polymer of units selected from the group consisting of trimethylsiloxy unit, dimethylsiloxane unit, methylhydrogensiloxane unit, and dimethylhydrogensiloxy unit, (D) is an amidosiloxane in which R and R' are methyl radicals and x is an integer of from 3 to 6.

5. The composition according to claim 2 in which the average ratio of organic radicals per silicon atom in (A) is in the range of 2.0025 to 2.02, (B) is a polymer consisting of trimethylsiloxy units, dimethylsiloxane units, and methylhydrogensiloxane units where the average number of siloxane units per molecule is less than 50, (C) is a reaction product of chloroplatinic acid and a polyorganosiloxane having at least two dimethylvinylsiloxy units per molecule and any additional siloxane units being dimethylsiloxane, (D) is a mixture of amidosiloxanes in which R and R' are methyl radicals and x has an average value of from greater than 3 to 6, and (E) an extending filler is present, (A) is present in an amount of 100 parts by weight, (B) is present in an amount of 4 to 10 parts by weight, (C) is present in an amount sufficient to provide from 5 to 50 parts by weight platinum per one million parts by weight of (A), (E) is present in an amount of 20 to 150 parts by weight, and the ratio of silicon-bonded hydrogen atoms in (B) to the silicon-bonded vinyl radicals in (A) is in the range of from 1.2 to 4.

6. The composition according to claim 5 in which the extending filler (E) is a finely divided quartz filler, a pigment is present, and there is present polymethylvinylcyclosiloxane in an amount of 0.01 to 0.5 part by weight.

7. The composition according to claim 4 in which the average ratio of organic radicals per silicon atom in (A) is in the range of 2.0025 to 2.02, (B) is a polymer consisting of trimethylsiloxy units, dimethylsiloxane units, and methylhydrosiloxane units where the average number of siloxane units per molecule is less than 50, (C) is a reaction product of chloroplatinic acid and a polyorganosiloxane having at least two dimethylvinylsiloxy units per molecule any additional siloxane units being dimethylsiloxane, and (E) an extending filler is present, (A) is present in an amount of 100 parts by weight, (B) is present in an amount of 4 to 10 parts by weight, (C) is present in an amount sufficient to provide from 5 to 50 parts by weight platinum per one million parts by weight of (A), (E) is present in an amount of 20 to 150 parts by weight, and the ratio of silicon-bonded hydrogen atoms in (B) to the silicon-bonded vinyl radicals in (A) is in the range of from 1.2 to 4.

8. The composition according to claim 7 in which the extending filler (E) is a finely divided quartz filler, a pigment is present, and there is present polymethylvinylcyclosiloxane in an amount of 0.01 to 0.5 part by weight.

9. The composition according to claim 2 in which the average ratio of organo radicals per silicon atom in (A) is in a range of 2.0025 to 2.02, (B) is a polymer consisting of trimethylsiloxy units, dimethylsiloxane units, and methylhydrogensiloxane units where the average number of siloxane units per molecule is less than 50, (C) is a reaction product of chloroplatinic acid and a polyorganosiloxane having at least two dimethylvinylsiloxy units per molecule and any additional siloxane units being dimethylsiloxane, (D) is a mixture of amidosiloxanes in which R, R', and R" are methyl radicals and x has an average value of from greater than 3 to 6, (E) a filler is present, and (G) a benzene soluble resin copolymer consisting essentially of triorganosiloxy units and SiO$_2$ units in which the mole ratio of triorganosiloxy units to SiO$_2$ units is in the range of 0.6 to 1 and the triorganosiloxy units are present as a combination of trimethylsiloxy units and dimethylvinylsiloxy units such that the dimethylvinylsiloxy units contribute sufficient vinyl to the resin copolymer to provide a vinyl content of from 0.5 to 3.5 weight percent vinyl, based on the weight of the resin copolymer; (A) is present in an amount of 100 parts by weight, (B) is present in an amount of from 0.5 to 10 parts by weight, (C) is present in an amount sufficient to provide from 5 to 50 parts by weight platinum per one million parts by weight of (A), and the ratio of silicon-bonded hydrogen atoms in (B) to the silicon-bonded vinyl radical in (A) is in the range of from 2 to 8.

10. The composition according to claim 9 in which (E) is a reinforcing silica filler which has a surface treated with trimethylsiloxy units, and which is present in an amount of 5 to 50 parts by weight, (G) is present in an amount of 5 to 30 parts by weight, a pigment is present and polymethylvinylcyclosiloxane is present in an amount of from 0.01 to 0.5 part by weight.

11. The composition according to claim 9 in which (E) is an extending filler and is present in an amount of from 20 to 150 parts by weight, (G) is present in an amount of from 25 to 50 parts by weight, a pigment is present, and polymethylvinylcyclosiloxane is present in the amount of from 0.01 to 0.5 part by weight.

12. The composition according to claim 4 in which the average ratio of organo radicals per silicon atom in (A) is in a range of 2.0025 to 2.02, (B) is a polymer consisting of trimethylsiloxy units, dimethylsiloxane units, and methylhydrogensiloxane units where the average number of siloxane units per molecule is less than 50, (C) is a reaction product of chloroplatinic acid and a polyorganosiloxane having at least two dimethylvinylsiloxy units per molecule and any additional siloxane units being dimethylsiloxane, (D) is an amidosiloxane in which R" is methyl radical and x is an integer of from 3 to 6, (E) a filler is present, and (G) a benzene soluble resin copolymer consisting essentially of triorganosiloxy units and SiO$_2$ units in which the mole ratio of triorganosiloxy units to SiO$_2$ units is in the range of 0.6 to 1 and the triorganosiloxy units are present as a combination of trimethylsiloxy units and dimethylvinylsiloxy units such that the dimethylvinylsiloxy units contribute sufficient vinyl to the resin copolymer to provide a vinyl content of from 0.5 to 3.5 weight percent vinyl, based on the weight of the resin copolymer; (A) is present in an amount of 100 parts by weight, (B) is present in an amount of from 0.5 to 10 parts by weight, (C) is present in an amount sufficient to provide from 5 to 50 parts by weight platinum per one million parts by weight of (A), and the ratio of silicon-bonded hydrogen atoms in (B) to the silicon-bonded vinyl radical in (A) is in the range of from 2 to 8.

13. The composition according to claim 12 in which (E) is a reinforcing silica filler which has a surface treated with trimethylsiloxy units, and which is present in an amount of 5 to 50 parts by weight, (G) is present in an amount of 5 to 30 parts by weight, a pigment is present and polymethylvinylcyclosiloxane is present in an amount of from 0.01 to 0.5 part by weight.

14. The composition according to claim 12 in which (E) is an extending filler, and is present in an amount of from 20 to 150 parts by weight, (G) is present in an amount of from 25 to 50 parts by weight, a pigment is present, and polymethylvinylcyclosiloxane is present in an amount of from 0.01 to 0.5 part by weight.

15. The composition according to claim 9 in which there is present a pigment and an amount of from 0.01 to 0.5 part by weight of polymethylvinylcyclosiloxane.

16. The composition according to claim 12 in which there is present a pigment and an amount of from 0.01 to 0.5 part by weight of polymethylvinylcyclosiloxane.

17. The composition according to claim 10 in which (A) is a blend of two polydimethylsiloxanes in which one polydimethylsiloxane has an average ratio of organo radicals per silicon atom of 2.004 to 2.02 and the other polydimethylsiloxane has an average ratio of organo radicals per silicon atom of 2.0025 to 2.005.

18. The composition according to claim 13 in which (A) is a blend of two polydimethylsiloxanes in which one polydimethysiloxane has an average ratio of organo radicals per silicon atom of 2.004 to 2.02 and the other polydimethylsiloxane has an average ratio of organo radicals per silicon atom of 2.0025 to 2.005.

19. A method of preparing a silicone elastomer composition which adheres to a substrate when the silicone elastomer composition is cured in contact with the substrate, comprising mixing from 0.01 to 2.5 parts of an amidosiloxane of the formula

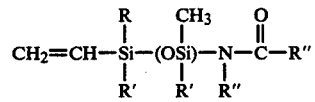

where R is a methyl, ethyl, or phenyl radical; R' is a methyl, ethyl, or 2-(perfluoroalkyl)ethyl radical in which the perfluoroalkyl radical contains 1 to 4 inclusive carbon atoms; R" is a methyl or ethyl radical; and x is an integer of from 3 to 20; with 100 parts by weight of a silicon elastomer composition comprising (A) vinyl containing polydiorganosiloxane having an average of about two silicon-bonded vinyl per molecule, an average ratio of organo radicals per silicon atom within a range of greater than 2 up to and including 2.03 and each organo radical of the polyorganosiloxane being a monovalent radical selected from the group consisting of hydrocarbon radicals and fluorinated alkyl radicals both having less than 7 carbon atoms per radical, (B) an organosilicon compound having an average of at least 3 silicon-bonded hydrogen atoms per organosilicon compound molecule and valences of any silicon atom in the organosilicon compound not satisfied by a hydrogen atom is satisified by a divalent oxygen atom or an organo radical wherein each organo radical is a monovalent radical selected from the group consisting of hydrocarbon radicals and fluorinated alkyl radicals both having less than 7 carbon atoms per radical, the organosilicon compound having no more than one silicon-bonded hydrogen atom on any one silicon atom, and (C) a platinum catalyst, (A) and (B) being present in amounts sufficient to provide a mole ratio of silicon-bonded hydrogen atoms in (B) to silicon-bonded vinyl radicals in (A) in the range of 1 to 10.

20. The method in accordance with claim 19 in which the amidosiloxane is mixed with (A) and (C) forming a Composition No. 1, (B) forms a Composition No. 2 and thereafter Composition No. 1 and Composition No. 2 are mixed to provide a product curable to an elastomer.

21. The method in accordance with claim 19 in which the amidosiloxane is mixed with some (A) and all of (C) forming a Composition No. 1, the remainder of (A) and all of (B) are mixed forming a Composition No. 2 and thereafter Composition No. 1 and Composition No. 2 are mixed to provide a product curable to an elastomer.

22. The method in accordance with claim 20 in which the product is applied to a substrate and thereafter heated above 70° C. to cure the product to an elastomer.

23. The method in accordance with claim 21 in which the product is applied to a substrate and thereafter heated above 70° C. to cure the product to an elastomer.

24. An assembly prepared by the method of claim 22 in which the elastomer is bonded to a substrate.

25. An assembly prepared by the method of claim 23 in which the elastomer is bonded to a substrate.

26. The assembly of claim 25 in which the substrate is glass.

27. The assembly of claim 25 in which the substrate is aluminum.

* * * * *

UNITED STATES PATENT AND TRADEMARK OFFICE
CERTIFICATE OF CORRECTION

PATENT NO. : 4,163,081

DATED : July 31, 1979

INVENTOR(S) : Jay R. Schulz

Page 1 of 2

It is certified that error appears in the above—identified patent and that said Letters Patent is hereby corrected as shown below:

Column 1, line 12 - the phrase "Adhering to silicone elastomer" should read "Adhering silicone elastomer"

Column 1, line 67 - the phrase "compound is the" should read "compound as the"

Column 2, line 55 - the formula

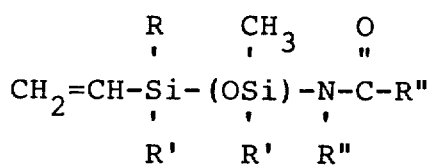

should read

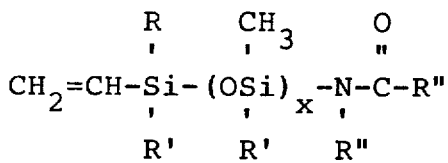

Column 13, line 15 - the phrase "the amount of" should read "an amount of"

UNITED STATES PATENT AND TRADEMARK OFFICE
CERTIFICATE OF CORRECTION

PATENT NO. : 4,163,081

DATED : July 31, 1979

INVENTOR(S) : Jay R. Schulz

It is certified that error appears in the above—identified patent and that said Letters Patent is hereby corrected as shown below:

Column 14, line 10 - the formula

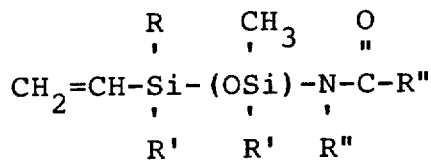

should read

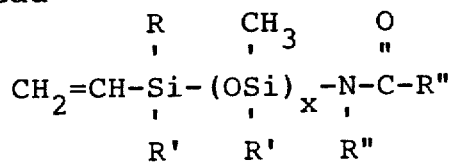

Signed and Sealed this

Twenty-first Day of September 1982

[SEAL]

Attest:

Attesting Officer

GERALD J. MOSSINGHOFF

Commissioner of Patents and Trademarks